Sept. 9, 1958    D. RUBENSTEIN    2,850,890
PRECAST ELEMENT AND REINFORCED FACING LAYER BONDED THERETO
Filed June 4, 1951    2 Sheets-Sheet 1

INVENTOR.
BY David Rubenstein

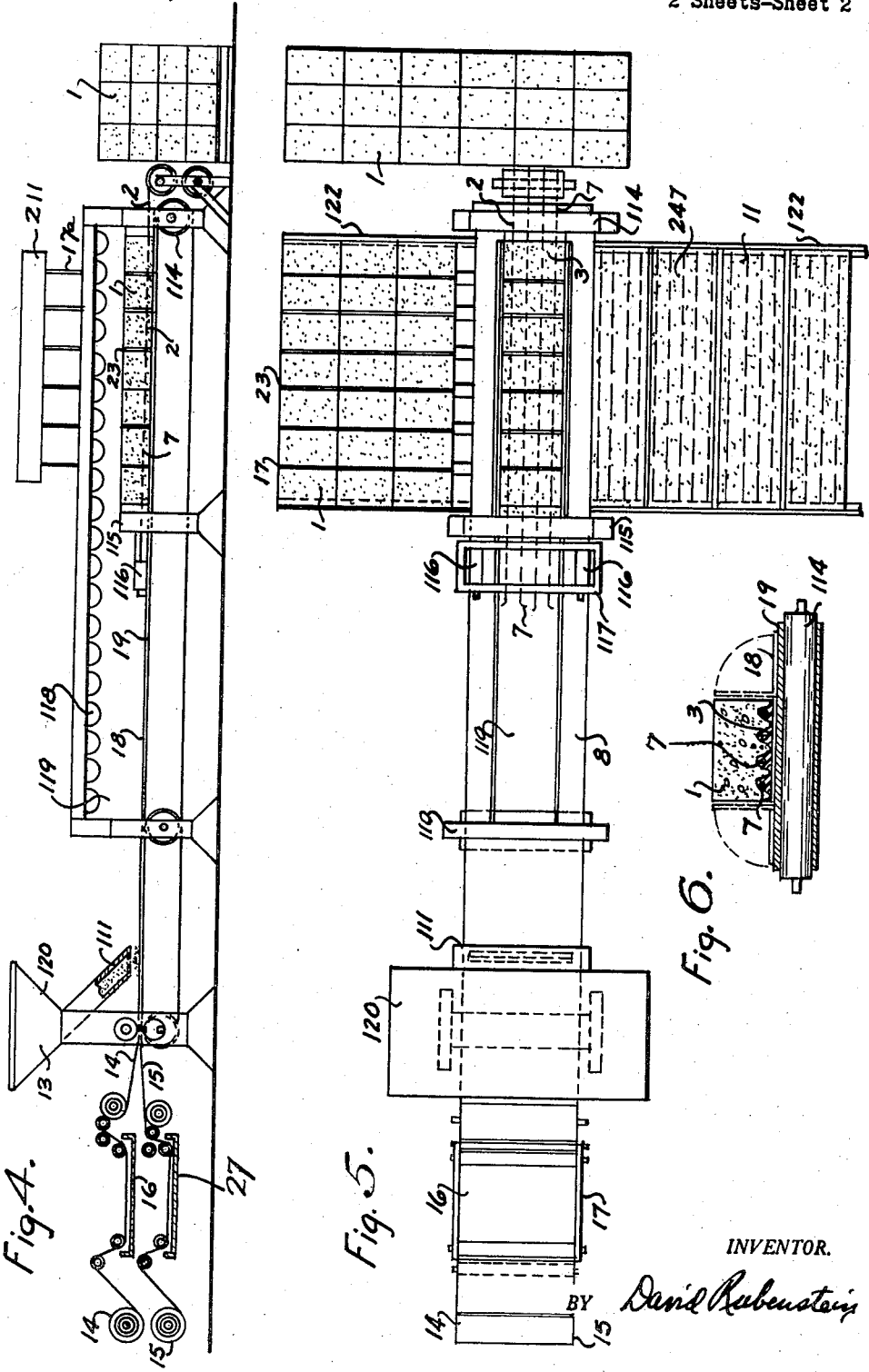

United States Patent Office 2,850,890
Patented Sept. 9, 1958

2,850,890

PRECAST ELEMENT AND REINFORCED FACING LAYER BONDED THERETO

David Rubenstein, San Diego, Calif.

Application June 4, 1951, Serial No. 229,852

7 Claims. (Cl. 72—36)

The present invention relates to the manufacture of integrated, bonded, plastic-laminated decorative-structural masonry constructions, elements and members having an integrated, bonded, decorative and protective finish and reinforcement in a state of tension on at least one surface thereof.

An object of the present invention is to provide a decorative-structural plastic-laminated fiber reinforced construction layer integrated, bonded and plastic-laminated in, on and to masonry members which is waterproof, chemically resistant, resistant to abrasion and made of impact resistant construction of high strength.

An object of this invention is to provide methods for applying the aforesaid surface constructions and decorative finishes and durable surfaces which may be applied to any adaptable masonry units.

Another object is to provide laminated layers integrally combined with masonry constructions without the use of a mold by direct application to the top or the bottom or all sides of said constructions which may be of various compositions, sizes and shapes.

Another object is to provide reinforced surface constructions adapted to prevent or minimize "spalling action" of members made of concrete and masonry.

The invention is illustrated in the accompanying drawings in which;

Figure 4 is a longitudinal elevation of an apparatus and machine for making reinforced blocks embodying the invention, and;

Figure 5 is a plan view of the apparatus and machine shown in Figure 4;

Figure 6 shows a cross section of an embodiment of the invention illustrating the laminating of three sides of a block embodying features of the invention.

Figure 1:
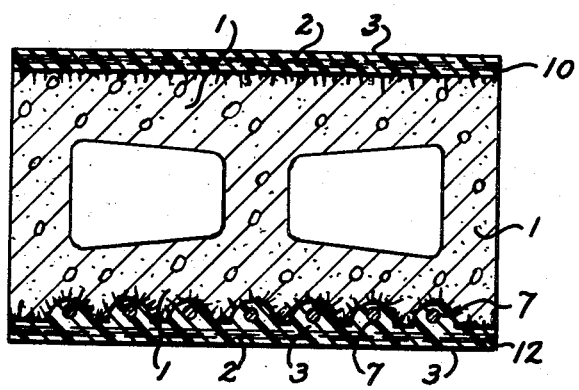
Figure 1 shows a preformed concrete block, the upper face having mat-type reinforcement and the lower face having mat-type reinforcement and linearly disposed tensile reinforcement.
Figure 2:
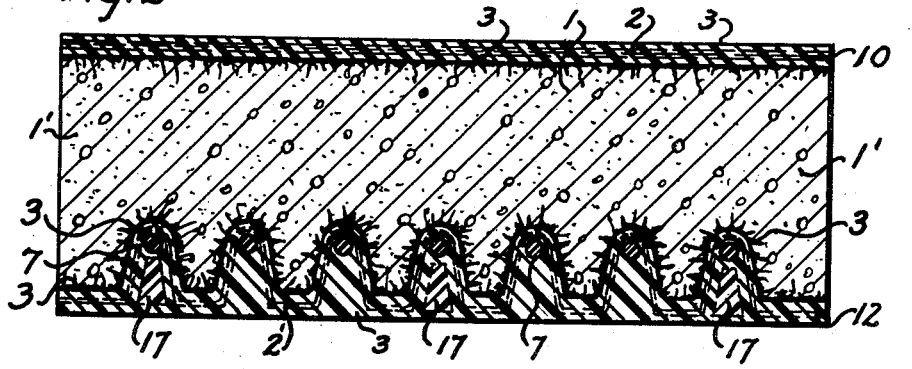
Figure 2 is a vertical section of a concrete block showing another modification of the invention.
Figure 3:
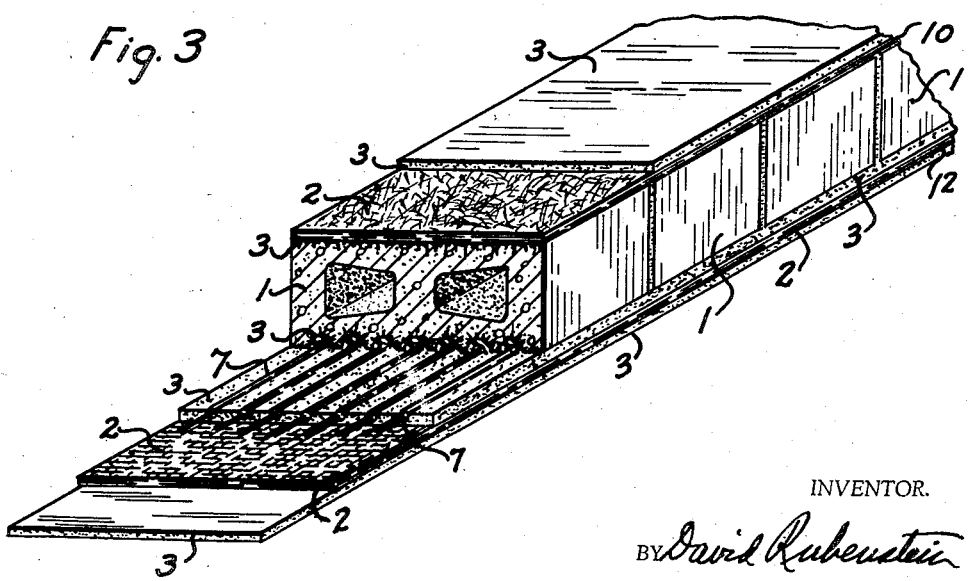
Figure 3 is a fragmentary view of the bonded row of blocks of Figure 5 showing a plurality of blocks or slabs embodying the features of Figure 1.

The Figures 1, 2, and 3 show embodiments of the invention wherein the integrated completed material end product of this invention comprises a porous structural element, e. g., a concrete or masonry material in the form of preformed single elements or units 1 and 1' or as a series or as a row of such preformed elements in units assembled into embodiments of the invention and having at least one surface thereof a surface construction layer comprising a resin composition, e. g., a polyester resin composition 3, in which is embedded a fibrous mat 2 which is substantially completely surrounded by and impregnated with resin composition 3 which may or may not include filler therefor. The fibrous mat 2 may be multidirectional or unidirectional fibrous material. An elongated strand 7 or a plurality of such strands spanning the member and being embedded in said resin composition in a state of tension may be provided as another element in the construction, or it may be an embodiment of fibrous mat 2 , i. e., said mat having unidirectional fibrous reinforcing material.

The preferred resin composition of the present invention, but not limited thereto, comprises an unsaturated polyester resin composition and may include a filler, e. g., mineral filler, sand, etc., used for filler purposes and also, if desired, used for pigment purposes. Pigments may or may not be used for primarily coloring the resin composition but is not limited thereto, i. e., pigments may be used for filler purposes or other purposes in the composition.

The use of bonded plastic resins is established in the field of knowledge so that many different types of plastic resins and/or chemical bonds are available for the purposes of this invention. Features and a variety of properties are provided by the type and kind of plastic resins and other incorporated materials used and said features are governed by the curing and bonding and laminating characteristics of these plastics, plastic resins and materials. The resin compositions are provided as integrated components in structurally engineered embodiments of the invention.

The porous structural material comprising a compressionally strong material as a component part of the preformed structurally reinforced member can be made out of any masonry or concrete material in the form of a member of the group consisting of Portland cement concrete blocks, Portland cement precast bodies, precast concrete slabs, precast concrete shapes, structural concrete members, perlite-concrete sandwich elements, pumice concrete elements, lightweight concrete elements and members, fire expanded shale aggregate concrete members, volcanic cinder concrete, processed cinder concrete, or in fact any porous structural material having substantial compression characteristics and compatible features. The porous structural material, e. g., a concrete made of fire expanded shale aggregate and Portland cement and sand as precast cured compressionally strong bodies are provided as structurally engineered embodiments of the invention.

Natural and artificial stone and stone-like products, bricks and clay products may be used as component parts of the preformed member. Each raw concrete or masonry product is used in a balanced designed structural engineering manner adapted to its own particular features in use.

The present invention is a combination of the art of chemical engineering and civil and architectural engineering and discloses and claims structural engineering features whereby the use of chemically induced force systems either alone or in combination with thermal and mechanically induced force systems provide the features of this invention. The products and structures made have substantial strengths and "tailored" properties.

Formulated compositions and mixtures provide the resinous components of the present invention, which formulations are comprised of polyester resins or other resins, rigid and non-rigid resins, plasticizers, vinyl monomers, styrene monomers, catalysts (e. g., organic peroxides), cements, fillers, minerals, sand, pigments, colors, bulk-fillers, pigment fillers, fibrous reinforcement, e. g., glass fibers in mat form or woven form or strands of roving or fiber, all as needed or each as needed in specific formulated compositions or mixtures adapted to the various products of the invention.

The fibers I use for embedment and reinforcement in the resin compositions include organic and inorganic fibers, woven and un-woven, mat or fibrous stranded embodiments such as fiber glass fabrics, fiber glass mats, fiber glass roving, cotton, hemp, sisal, nylon, synthetics, asbestos, burlap, etc. The fiber glass fibers are preferred but the embodiments of the invention are not limited thereto.

Fiber glass fibers, both as random multi-directional fiber mats and unidirectional fiber strands and mats make excellent reinforcement in the present invention.

The method of manufacturing prestressed masonry and concrete constructions and the structural components, blocks and units therefor, provides a means to chemically prestress the precast blocks, units and structural components of the building or other structural construction. This invention provides prestressing of prestressed pre-loads into concrete blocks, slabs or any other adaptable member designed for loading in tension, compression, shear or torsion, by the shrinking, condensing, tightening action which introduces prestress preloads into the concrete or other masonry material as the materials of the lamination undergo setting, cooling, solidification, chemical reaction, shrinking, condensing and unification with the preformed or precast concrete components and shapes or structural members.

This can be likened to the same thing as occurs to a wooden wheel when a blacksmith "sweats on" a steel or iron rim and the wheel becomes tightened as the wood of the wheel takes up the prestress stresses introduced by the shrinking of the cooling iron or steel.

The transfer of stress into the precast concrete component is accomplished by contact of the plastic resins, e. g., unsaturated polyester resins, that fill porous holes and interstices connected therewith and by the general porosity of the concrete, and on bonding together the plastic resins, fiber glass, or other fibers or reinforcements, fillers, steel wire or cable reinforcements with the concrete. The shrinkage stresses of the plastic resins, e. g., unsaturated polyester resin compositions, and other components that come about by heating and cooling, setting or fixing and/or chemical reactions thus introduce prestress forces into the precast concrete building constructions and structural components thereof, and by this means make such building constructions and structural components thereof, preloaded for ultimate use, and thus makes them stronger, resilient, flexible and better suited to end uses.

The stressing means includes features and novel means which utilizes the substantial and large forces resulting from the chemical reactions of polymerization of thermosetting resins and the like, and the expansion forces of the materials of the laminate, whereby the plastic resins congeal, set, fix and shrink-fit into place. The forces so generated at the same time prestress the materials of the laminate which the plastic resins inclose and bond together as well as prestress the concrete bodies to which the laminations are applied and integrates the combination into unitary structures and members. The prestressing forces resulting from the chemical changes are measurable by the known shrinkage of the plastic resins or plastics used.

This chemical reaction which occurs provides large and substantial forces that prestress the concrete body or block, the reinforcing fibers and the selected fillers, binders, extenders, pigments, colored or functional ingredients. In combination with thermal pre-compression or tension forces, with mechanical pre-compression or tension forces, or forces generated in situ, the chemical forces provide means alone or in combination with thermal and mechanical prestressing to provide prestressed preload in and of and with the materials of the composite structure making up the prestressed construction. The stresses of shrinkage resulting from such a reaction chemically induced as e. g., a polymerization reaction, said reaction chemically induced as e. g., said reaction occurring in the setting of e. g., an unsaturated polyester resin composition, are transmitted as the complex stresses of shrinkage in the plastic composition through the interface bond area of the laminated structure or construction or block as compressive stress in the surface of the bonded materials.

The use of precast-prestressed and prestressed-precast pre-tensioned or post-tensioned concrete using steel wire, rod or cables and the use of reinforcing steel generally is an accepted procedure. The products and principles of this invention are not limited to any particular construction of prestressing, post-tensioning or pre-tensioning of steel wire, rods, or cables. The use of prestressing steel is an essential part of some laminations to develop the features of this invention in combination with the fibrous materials and reinforcements and plastic resin compositions.

This invention comprises the sandwiching and chemical and mechanical dispersion of aggregates and materials to integrate and laminate and compose the materials used. By using materials having structural, chemical, architectural, decorative and other functional characteristics normal to the materials and by casting, membering, joining, assembling and incorporating by lamination, component parts, pieces, units, fabrics, binders, fillers, fiber glass mats, fiber glass strands, extenders, natural fibers, synthetic fibers, sisal fibers, steel wire, either woven or plain, deformed or smooth reinforcements, copper wire, metal reinforcements of any type, wire cables, rods, perforated metals, hemp, rope, nylon, rubber, synthetics, plastics, plasters, wood fibers, wood pieces, bamboo, burlap, asbestos filler, asbestos, crushed rocks, sand, minerals, Portland cements, natural cements, and any other materials whose functional characteristics add to, comprise, make, constitute, cast, laminate or incorporate added strength in tension, compression, shear and torsion, new and novel composite improvements of this invention are made in the building art, craft, process and methods.

The products provided can be pliable and/or rigid, bonded, laminated constructions consisting of natural or synthetic resins such as an unsaturated polyester resin composition, pigmented or unpigmented, reinforced with incorporated material of any type, using one or more materials of like or unlike types and examples of which are fiber glass mat, aluminum, minerals, sand, or fiber and united with concrete block or slabs by mixing and bonding and laminating by thermal setting or at normal air temperatures and/or pressure forming finished structural members requiring no further work.

Advantageously, materials possessing great strength, e. g., in tension made of thin laminated membrane type materials, e. g., polyester resin-fiber glass mat-bulk-filler-fiber glass stranded constructions, and laminated with thicker materials of relatively low tensile strength but possessing great compressive strength, e. g., precast concrete slabs, provide thin laminated membrane surface constructions having high flexural strength together with high tensile strength laminated to materials having great compressive strength which make up designed predetermined strength structural materials suitable for both normal and extraordinary loading conditions resulting from temperature changes, compression loads, tension loads, impact, shock, shear loads, torsion loads and/or any other distorting loading tendency.

As an example, concrete blocks or slabs designed for e. g., 5,000 p. s. i. compressive strength 8" thick wall to which blocks or slabs is laminated 2.0 oz. fiber glass mat with an additional layer of unidirectional fiber glass mat or sisal fiber, and all laminated together with e. g., polyester resins provides a building component of great strength and utility which has a surface layer component of e. g., ⅛" depth on a 7⅞" thick body (nominal wall thickness of 8" block) with practically the same strength as common steel in tension.

For larger loads and conditions of work to be performed by my plastic resin laminated prestressed reinforced structural members, designed characteristics can be provided by using e. g., 220,000 p. s. i. prestressing wire cable together with e. g., 5,000 to 9,000 p. s. i. compression strength concrete and laminated with woven fiber glass or other fibers embedded in polyester resin compositions as laminated constructions have an ultimate flexural strength, but not limited thereto, flatwise, of e. g., 56,000 p. s. i. at room temperature. Such laminations will produce prestressed reinforced plastic-concrete structural members having by way of example, approximately 40% less in cubic measurement and as much as 80% less steel, and having further values to be derived from additional strengths derived from the surface layer construction or coating. At a temperature of 160° F. the flexural strength of the polyester resin fiber glass surface layer construction has only a slight drop to, e. g., about 50,300 p. s. i. Electrical properties as well as resistance to chemicals, abrasion and moisture for such a laminate are outstanding. By the use of pumice or other volcanic aggregates or fire expanded shales, volcanic glass or obsidian, fire proofing of reinforcing, e. g., steel reinforcing can be achieved and the laminate so made that the exterior face is non-burning or self-extinguishing fire resisting construction.

The following is an illustrative example of a desired product but not limited thereto. A product is made by the application of an unsaturated polyester resin composition, pigmented or unpigmented, on a hard non-porous surface, either smooth, textured or ribbed, incorporating in the resin composition a fiber glass mat or some other suitable filler or reinforcement; subsequently gelling the resin composition to a point where it is firm but tacky and then placing against the gelled composite any porous body the surface of which has been previously moistened with a coating of the same or other type polyester resin composition.

After completing the "cure," either at normal air temperatures or with heated platen, or in a heated chamber, the non-porous mold surface, which can be a prepared surface, glass, metal sheet, aluminum, stainless steel, or any other non-bonding metal, or plastic film, Celluloid, cellophane, or in fact any other suitable surface, is removed leaving as the exposed surface a hard plastic film or laminate bonded to the porous body. In the present example the porous surface materials which may be laminated and are made by the method into composite structures of the invention are Portland cement concrete blocks, precast concrete slabs, poured concrete slabs and shapes, structural members, perlite concrete, pumice concrete, lightweight concrete, natural and artificial stone, bricks, clay products, fiber boards, wood, plywood, pressed fiber boards, so-called "hard board," gypsum shapes, plastics, and other materials of porous nature and substantial compressive strength. Said materials are selectively used and combined and "sandwiched" to produce the designed laminated construction of any desired type or kind.

The products of such an unsaturated polyester resin composition lamination have resiliency and compressibility stress and strain relieving capacity that is rubber-like and provides to designed degrees abilities of stretch, tension, compression, torsion, twist, shear and generally flexible movements without separation of the plastic resin-fibrous material, e. g., fiber glass laminate or its separation from the concrete body within the designed limits of stress and strain of the lamination.

As an example and test of these characteristics, a concrete block having an ultimate strength in tension of about 500 p. s. i. was laminated with about a ⅛" thick layer of fiber glass and polyester resin composition, the polyester resin composition enclosing the fiber glass and made as said ⅛" thick layer being on one side of the block. The laminated block was then stressed in flexure by third point loading and was then broken in a testing machine at the recorded pressure of 6,200 p. s. i., that is, the concrete component of the laminated block failed by complete fracture in a single crack and with some spalling on the uncoated side of the concrete block. The laminate of fiber glass and polyester resin composition did not break, leaving the surface as whole as when before the test, with this difference that the internal strain and hair line marks showed beneath the surface of the laminated layer of the concrete block. Other laminates integrally combined as in the example above given were tested, some of which had different functional requirements, but in all cases greater strength resulted in the process of lamination over that of normal concrete by the applications of polyester or similar resins, fillers, fibers and other materials of the lamination.

I have found that embodiments of the invention have a hard yet pliable acid and alkali resisting, waterproof, practically impermeable, fire resisting construction. Polyester resins and the compositions of materials make a non-burning or slow burning or fire resisting material according to the type of mixture used that is capable of self-quenching materials condition and that can eliminate or materially reduce fire hazards. If polyester resins are used without fire resisting ingredients added to the composition, they have an ignition point of about 850° F. Fire and flame applied to the flat surface in all probability will not be able to ignite it. Flames applied to the polyester resin composition made without the use of fire resisting ingredients applied to an exposed edge will permit burning along that edge and must decompose for burning to progress. The fumes of such combustion are not toxic. Other plastics when used for herein described functions of lamination will not burn.

The machine and apparatus shown in Figures 4, 5, and 6 provide means for the manufacturing of prestressed concrete or masonry laminated plastic resin-fibrous reinforced building constructions and structural embodiments that comprises a set of conveyors, feeders, etc., feeding materials in intervals or in continous flow to a prestressing bed and stressing device. The machine can prestress steel wire or cable or rods as well as fiber glass or other fibrous reinforcements of tensile reinforcement type. The machine feeds into the prestressing bed, fiber glass reinforcements and mats of reinforcement inclosed in plastic resins or combined with plastic resins, e. g., polyester resin compositions, and thermal sets by direct means of application of heat, the materials of the laminates to complete the prestressed laminated plastic resin fiber glass reinforced (or other fibrous reinforced) building constructions, etc.

I can make these precast, precast-prestressed reinforced concrete building constructions and structural components on this machine and with its apparatus by coating, painting and/or spraying powders like aluminum powder or any other metal powders, fillers, or minerals onto surfaces or into holes in the said surfaces when these powders are carried in a suitable vehicle, e. g., a polyester resin composition, for the purpose of coloring the surfaces or increasing its strength by laminating with the coated concrete, fiber glass, or other fibers.

The machine and apparatus shown in Figures 4, 5, and 6 is adapted to make several embodiments of the invention. One such embodiment of the invention comprises a preformed reinforced concrete structural member comprising a row of adjacent preformed concrete units, each unit having substantially a planar face, said faces being substantially coplanar and completely covered by a layer of polyester resin composition, said coplanar faces being penetrated by said resin composition and the portions of said units adjacent thereto being permeated by said resin composition, a fibrous, e. g., fiber glass, mat covering said coplanar faces and embedded in said resin composition, and a prestressed elongated strand spanning the units and being embedded in said resin composition in a state of tension, said resin composition bonding said strand and fiber glass mat to said units.

The same machine can make a preformed structural member comprising a precast porous element of any size adapted to working on the machine having substantially a planar face, said face being completely covered by a layer of polyester resin composition, said face being penetrated by said composition and portions of said element adjacent thereto being permeated by said resin composition, a fibrous mat covering said face and embedded in said resin composition, a prestressed elongated reinforcement extending entirely across said face and being embedded in said resin composition in a state of tension, said resin composition bonding said reinforcement and said mat to said element.

Referring now to the drawings for specific embodiments the top layer 10 of Figure 1 is a cross section of a concrete block, body or slab section bonded laminate comprising the concrete body 1 to which the fiber glass 2 and the polyester resins 3 and other plastic components are fixed by bonding and lamination to form the resulting composite cross section. 1 can be concrete of any predetermined strength and 2 can be any one or more of several binders, fillers, fibers, sand, synthetics, minerals or substances which together with 3 a plastic resin, e. g., a polyester resin composition, will when laminated and bonded by pressure and setting of the resins form the finished bonded concrete laminate.

Figure 1 on its bottom layer 12 shows a composite construction made of concrete block 1, i. e., the same block referred to above of any desired sizes and shapes, and in this case being a grooved face precast block and having standard steel bar reinforcing 7 disposed in the grooves. The reinforcement 7 can be prestressing steel wire or rod or cable of high tensile capacity. Either reinforcement can be bonded together into laminated construction with fiber glass mat 2 and embedded in polyester resin composition 3. Note that the prestressed wire reinforcement 7 is set into grooves cast in the concrete block 1 and bonded therein by fiber glass mat 2 which can either be pressed into place behind the wire and next adjacent to the face of the concrete block 1 or it can be placed in front of the wire and next adjacent to the outer face of the block 1, but in either case being embedded and bonded and enclosed with the polyester resin composition 3 to the concrete block 1, the fiber glass 2 and the polyester resins and other components such as aluminum, sand, ground mineral, color, sisal fibers, cotton, wool, nylon, synthetics, luminescent materials and any other materials that will give designed characteristics being sought in the finished completed construction.

Also note the strips of block laid out in desired length over the prestressing machine or form in which prestressed wire of high tensile capacity has been made ready. The machine has a platen for the setting by thermal means or otherwise of the polyester resin compositions and as a receptacle for the saturated fiber glass mat. It will produce prestressed concrete slabs of any given length, rapidly and efficiently, in the matter of minutes.

While steel is the commonly used reinforcement for building construction I have found that any material such as fiber glass strands, nylon rope, sisal, hemp, or any other materials that can maintain a sustained tensile strength when used in the manner illustrated by 7 above will serve the same purpose as steel in accordance with predetermined structural designs and characteristics of structure. Figure 1 illustrates yard stock unit sizes of blocks but any convenient size can be used. Handling equipment and weight are the governing criteria.

Figure 2 is a cross section of a slab 1' showing concrete which has substantially a planar face on the top face 10 and grooved recesses cast in the bottom face 12. I have found that the grooved concrete element or member or block provides an advantageous and economical means for fire proofing the reinforcement. The reinforcement can be covered to any required depth in compliance with city or other codes of building by making the grooves of the required depth and shape or curvature. The grooved side 12 of the block or the planar side 10 can be used along if two sides are not required to be finished. The grooved recess has fiber glass 2' and polyester resins 3 placed in them as shown and around which they bond and coat steel reinforcing or an equivalent reinforcing 7. In some embodiments added functional and tensile reinforcing 17 comprised of e. g., fiber glass and polyester resin compositions form component parts of a laminated surface construction layer integrated and bonded to the concrete slab 1'. The polyester resin compositions and fiber glass reinforcement impart structural stability and function and end uses not now available in existing construction embodiments of the same mass.

For some types of installations and uses steel reinforcement will not be needed, and tension and other stress requirements can be derived from fiber glass, fillers, and polyester resin compositions laminated to the concrete.

I make such a preformed reinforced structural member comprising a precast porous element having substantially a planar face, the face of said element having a groove, said face being completely covered by a layer of polyester resin composition, said face being penetrated by said resin composition and a portion of said element adjacent thereto being permeated by said resin composition, a fibrous mat covering said face and embedded in said resin composition, a prestressed elongated reinforcement extending within the groove entirely across said face and embedded in said resin composition in a state of tension in said groove, and said resin composition bonding said reinforcement and said mat to said element.

Figure 3 shows an isometric fragmentary view of the bonded row of blocks of Figure 5 showing a plurality of blocks or slabs embodying the features of Figures 1 and 2. The concrete blocks or bodies 1 have a grooved construction as shown on the bottom side thereof and a smooth planar surface on the top thereof. The polyester resin composition 3 is laid on the making apparatus shown in Figures 4 and 5 by means shown or by spraying, coating or equivalent means whereby the required depth of layer 3 is applied. A mat of fibrous material of any desired gauge mat or fiber is laid on the polyester resin composition 3 and is embedded therein. Enough polyester resin composition 3 is applied to provide a surplus over that required to completely impregnate and cover the mat so that strands of reinforcement, e. g., fiber glass strands 7 of whatever desired tensile strength capacity as the specific design calls for are embedded in the resin composition 3.

The resin composition 3 is provided in excess of the amount needed to completely cover and impregnate said strands 7 of e. g., of fiber glass or e. g., of steel, so that when a concrete block 1 is placed thereover a portion of the said resin composition penetrates the surface of the block and permeates the porous structure of the block adjacent thereto.

The resin saturated fibrous mat can be advanced over the platen face of the apparatus and when the element has its bottom side completed it can be raised by apparatus not shown and turned over and then lowered down on a newly advanced lamination for completing the top face and the composite layer of laminated materials and block cured to a completed state. Thus, this makes a two faced member having each face reinforced as in Figure 3. The construction in any particular use is designed for amounts of reinforcement as tensile, compression, shear or torsion reinforcement according to the art of structural engineering. Three or more surfaces may be completed in the same way.

Fiber strands 7 may be tensioned in advance of lowering of the concrete block 1 onto the plastic resin composition laminated layer 3 containing e. g., a 2 oz. multi-directional mat 2 embedded therein. The tensioning is done by hydraulic jack means 116 shown in Figures 4 and 5. The prestressed preload thus applied can be a composite prestressed preload induced by the mechanical means of the apparatus like that of Figures 4 and 5 and "captured" into the concrete and its laminated surface construction layer 10 and/or 12 by the plastic resin composition 3 when said resin composition is set in its final state.

As shown in Figure 6 contiguous faces are finished as laminated constructions, both for their structural improvement and for the decorative features of architectural merit. I make such a preformed structural member comprising a row of adjacent preformed concrete members, each member having substantially contiguous planar faces, some of said faces being substantially coplanar and completely covered by a layer of polyester resin composition, said faces being penetrated by said resin composition and the portions of said members adjacent thereto being permeated by said resin composition, a fibrous mat covering said faces and embedded in said resin composition, and a prestressed elongated reinforcement embedded in said resin composition, said reinforcement in a state of tension spanning said coplanar faces, said resin composition bonding said reinforcement and fibrous mat to said members.

The elongated reinforcement used in the preformed structural reinforced member can be comprised of steel reinforcement as rod, wire or prestressing type steel cable or it can be comprised of a plurality of longitudinally tensioned fibrous strands, e. g., fiber glass strands.

In using the machine and apparatus shown in Figures 4, 5 and 6 reinforcing wire or cable 7 and/or fiber glass 2 or other tensile reinforcement disclosed herein are pulled from the reel and head frame 114 and fed over conveyor belt 19 to prestressing jack frame 115 and said reinforcing securely anchored in said frames. Hydraulic jacks 116 are then operated and the prestress wire or cable 7 and/or fiber 2 is pretensioned to the desired prestress as recorded on gauge of the hydraulic jack.

Concrete blocks, slabs or sections 1 are stockpiled adjacent to an end of the machine, the same being in a dry condition or are dried before use.

While this procedure of prestressing the reinforcement is in progress fiber glass mat or fabric 14 and/or sisal or other suitable fiber mat or filler 15 are fed through rollers into and out of resin tanks 16 and 27 taking up into the fibers the polyester resin compositions or other plastic resins and thence feeding underneath hopper 120 and onto belt 19.

Mineral fillers and/or binders 13, which can be polyester resin binder composition with a filler incorporated in it are fed through control chute 111 onto belt 19 onto aluminum sheet or pellets or other suitable metal or material form pallet 18 which now has on it the fiber glass 14 and the sisal fiber 15 if used in any specific construction then being made, and the binders 13 and all of which are mixed and integrated toward lamination and are in process of gellation of the plastic resins of the compositions.

The conveyor belt 19 and form pallet or pan mold moves slowly or at a predetermined speed through the heat chamber 119 and heat from infra-red lamps 118 gel to a pre-cure and cure the gelled plastic resins so that a tacky surface is had. This amount of cure can be varied to suit end product needs. Conveyor belt 19 continues to move the partially cured laminate under the concrete blocks 1 or so that the blocks can be manually placed thereover, or be placed by mechanical or other means not shown, and the prestressed wire or cable 7 and/or fiber 2 is under the blocks 1 that have been preheated in a heat chamber 119 and coated with polyester resin composition which is provided in tanks 16 or 27 and which can be similar to 3 or can be 3 and thence the coated concrete blocks 1, slabs or shapes are set over the reinforcement 7 and/or 2. The concrete blocks 1 are then caused to be pressed down on the wire or cable reinforcement 7 and/or fiber glass reinforcement 2 and all bonded and integrated and laminated to the partially cured prepared surface lamination layer which now rests in or on the form pallet 18. The whole component consisting of the concrete blocks 1, the fiber glass 14, and/or the sisal fiber 15, the binders 13, the steel wire or cable reinforcements 7, and/or fiber glass 7 and/or fibers 2 and the polyester resin compositions and/or other plastic resins are allowed to complete the "cure" at required temperature desired by the design, which temperature e. g., could be 250° F. The description of the combination of materials herein is not limiting to those given, but is for example only, some of the materials being used in one construction and some being used in another according to the art of architectural and structural engineering, there being three generally used types of materials needed to make the construction, i. e., the plastic resin composition, e. g., a polyester resin composition which includes a catalyst system, pigmentation, and fillers or extenders, the reinforcement of fibrous strands e. g., fiber glass strands, fibers, mats, etc., as required, and the masonry or concrete block or body. In some constructions steel reinforcement is included, and in some constructions the polyester resins are used without pigmentation or fillers, or with one and not the other.

When a building construction member or block 247 is cured complete it is moved sideways by conveyor over tracks 122 and stockpiled as a complete block, beams, column, wall section, floor section, roof section, ceiling section or any other designed structural reinforced concrete member either complete in itself for final use or as a component for further fabrication and/or prestressing.

When it is desired to laminate three or four sides of a reinforced concrete component, aluminum or other suitable material form pallet 18 is placed over conveyor belt 19 and the plastic resin composition gelled on this form pallet 18 until it is sufficiently cured to retain shape and still remain tacky.

The sides of the concrete block 1 are coated with polyester resin composition and/or other plastic resins and the side members of the form pallet 18 are raised vertically or any other angle desired and as required by the shape of the block, and clamped in place adjacent the sides of concrete block 1 and the whole then allowed to cure completely as required.

In Figures 4 and 5, pan 211 container holds polyester resins and/or other suitable plastic resins and from this pan 211 small flows or jets of the plastic resins 17a are allowed to flow into the joints 23 to secure and bond the concrete blocks one to the other, i. e., if such bonding is desired. A sheet of fiber glass mat reinforcement which can be impregnated with plastic resin and partially cured and then inserted between the blocks in the joints and the whole laminate cured completely while compressed. On completion of curing, prestressed wires and/or cables or other reinforcement are cut from or released from the machine anchorage and allowed to transfer stresses previously prestressed into said prestressed wires, cables, etc., as prestressed preload into the concrete blocks or structural assemblies then being made and the machine reset for another run.

Note that this machine can be extended to long lengths for multiple or long unit prestressing of the components. Also the machine can be used for making blocks of convenient lengths and sizes and later have them prestressed into whole walls and slabs and structural components embodying the invention. Conveyor 122 can be thus used in either direction. Variations of the method and procedure herein given for this type of machine can and will be made and the above is illustrative and not limiting in method or process or procedure. The machine will reduce time of manufacture, cut costs and generally produce a better prestressed reinforced concrete construction.

The invention here claimed is concerned with the structural engineering features of the combination of the reinforced plastic compositions with the building unit, e. g., a concrete block, concrete slab, wall, ceiling, floor, beam, column, or other building component of a masonry nature or porous structural material of substantial compressive strength; and the nature of such combinations whether in single units or multiple joined units wherein the surface is improved and the structural strengths and resistances are greatly enhanced by the features of prestressing preloads into preformed concrete or masonry bodies by utilizing the chemically generated forces resulting from chemical reactions of e. g., polymerization of plastic resins, and/or the setting or fixing of forces into such constructions as prestressed preload when generated by known means, i. e., that these thus induced forces are captured and fixed in place by set plastic resins and are cooperatively used with chemically induced forces of this invention.

Although some of the embodiments and examples set forth herein are substantially identical with those given in companion cases covering related but distinct inventions, it will be readily understood by those versed in patent law and practice that this is because these practical articles and methods embody inventions, each or some of which can be used with or without the others, i. e., some of the inventions thus together may be considered optical or can be replaced by alternatives.

The examples and alternatives given should not be regarded as exhaustive or limiting of the invention but, on the contrary, are given for the purposes of instructing others in the best manner of using and applying the invention and so far to explain and illustrate the principles thereof that others will be enabled to use the invention in many modifications and various embodiments, each as may be best adapted to the requirements of a particular use.

While certain preferred embodiments of this invention have been specifically disclosed, it is understood that the invention is not limited thereto, as many variations will be readily apparent to those skilled in the art and the invention is to be given its broadest possible interpretation within the terms of the following claims:

Having described the invention, what is claimed as new is:

1. A preformed reinforced concrete structural member comprising a row of adjacent preformed concrete units, each unit having substantially a planar face, said faces being substantially coplanar and completely covered by a layer of polyester resin composition, said faces being penetrated by said resin composition and the portions of said units adjacent thereto being permeated by said resin composition, a fiber glass mat covering said faces and embedded in said resin composition, and a prestressed elongated strand spanning the units and being embedded in said resin composition in a state of tension, said resin composition bonding said strand and fiber glass mat to said units.

2. A preformed reinforced structural member comprising a precast porous element having substantially a planar face, said face being completely covered by a layer of polyester resin composition, said face being penetrated by said resin composition and portions of said element adjacent thereto being permeated by said resin composition, a fibrous mat covering said face and embedded in said resin composition, a prestressed elongated reinforcement extending entirely across said face and being embedded in said resin composition in a state of tension, said resin composition bonding said reinforcement and said mat to said element.

3. A preformed reinforced structural member comprising a precast porous element having substantially a planar face, the face of said element having a groove, said face being completely covered by a layer of polyester resin composition, said face being penetrated by said resin composition and a portion of said element adjacent thereto being permeated by said resin composition, a fibrous mat covering said face and embedded in said resin composition, a prestressed elongated reinforcement extending within the groove entirely across said face and embedded in said resin compostion in a state of tension in said groove, and said resin composition bonding said reinforcement and said mat to said element.

4. A preformed reinforced concrete structural member comprising a row of adjacent preformed concrete members, each member having substantially contiguous planar faces, some of said faces being substantially coplanar and completely covered by a layer of polyester resin composition, said coplanar faces being penetrated by said resin composition and portions of said members adjacent thereto being permeated by said resin composition, a fibrous mat covering said coplanar faces and embedded in said resin composition, and a prestressed elongated reinforcement embedded in said resin composition, said reinforcement in a state of tension spanning said coplanar faces, said resin composition bonding said reinforcement and fibrous mat to said members.

5. A preformed reinforced structural member as claimed in claim 2 in which said elongated reinforcement is comprised of a plurality of longitudinally tensioned fiber glass strands.

6. A preformed reinforced structural member as claimed in claim 2 in which said elongated reinforcement is comprised of steel reinforcement.

7. A preformed reinforced structural member as claimed in claim 1 in which said elongated strand is comprised of prestressing type steel cable.

References Cited in the file of this patent

UNITED STATES PATENTS

| | | |
|---|---|---|
| 1,817,022 | Slidell et al. | Aug. 4, 1931 |
| 1,844,497 | Brassert et al. | Feb. 9, 1932 |
| 1,953,337 | Carson | Apr. 3, 1934 |
| 1,955,760 | Nichols | Apr. 24, 1934 |
| 2,052,229 | Hyde | Aug. 25, 1936 |
| 2,115,667 | Ellis | Apr. 26, 1938 |
| 2,193,635 | Marshall | Mar. 12, 1940 |
| 2,294,556 | Henderson | Sept. 1, 1942 |
| 2,372,048 | Auxier | Mar. 20, 1945 |
| 2,392,551 | Roe | Jan. 8, 1946 |
| 2,394,227 | Barber | Feb. 5, 1946 |
| 2,413,990 | Muntz | Jan. 7, 1947 |
| 2,414,011 | Billner | Jan. 7, 1947 |
| 2,425,883 | Jackson | Aug. 19, 1947 |
| 2,455,153 | Abeles | Nov. 30, 1948 |
| 2,460,309 | Rapp | Feb. 1, 1949 |
| 2,477,404 | Grant et al. | July 26, 1949 |
| 2,513,268 | Steinman | June 20, 1950 |
| 2,571,717 | Howard et al. | Oct. 16, 1951 |
| 2,751,775 | Sergovic | June 26, 1956 |
| 2,752,275 | Raskin et al. | June 26, 1956 |

FOREIGN PATENTS

| | | |
|---|---|---|
| 542,801 | Great Britain | of 1942 |
| 561,231 | Great Britain | of 1944 |
| 582,862 | Great Britain | of 1946 |

OTHER REFERENCES

"Tailor-made Polyester Resin" in "Modern Plastics," pages 111–115, October 1947.

"Concrete Sealed by Glass Cloth and Resin" in vol. 57, No. 6, pages 12 and 45 of "Concrete," June 1949.